INVENTOR.
ANDREW M. ARCHER
BY
Polachek & Saulsbury
ATTORNEYS.

INVENTOR.
ANDREW M. ARCHER
BY
*Polachek & Saulsbury*
ATTORNEYS

Nov. 24, 1970   A. M. ARCHER   3,543,218
SAFETY CONNECTORS FOR ELECTRICAL EXTENSION CORDS
Filed March 8, 1968   5 Sheets-Sheet 3
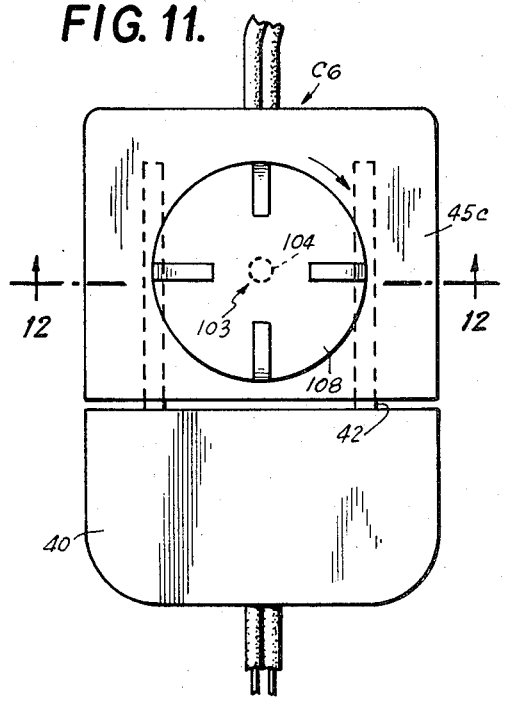
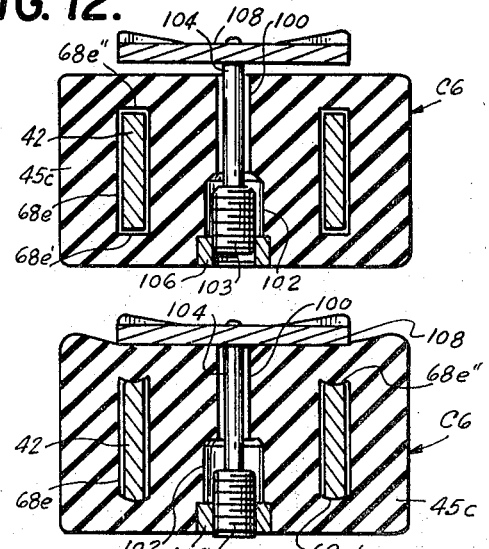
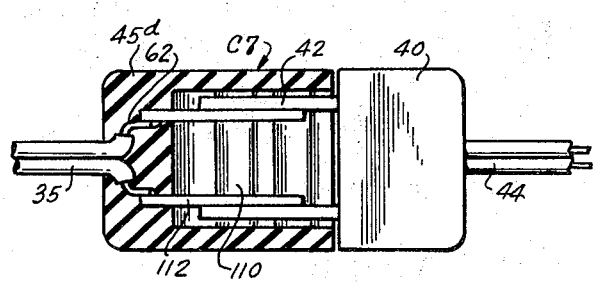
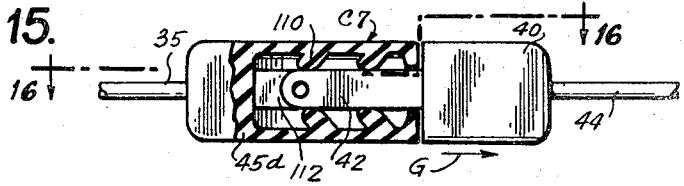
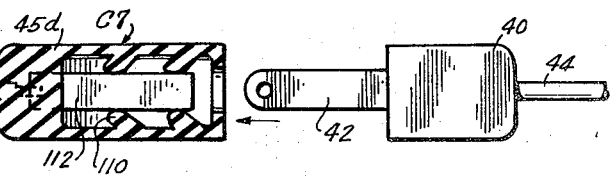
INVENTOR.
ANDREW M. ARCHER
BY
Polachek & Saulsbury
ATTORNEYS.

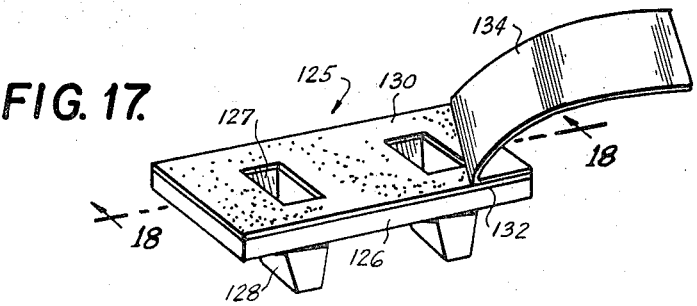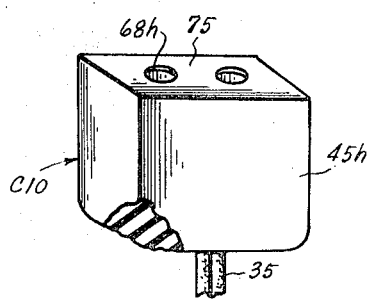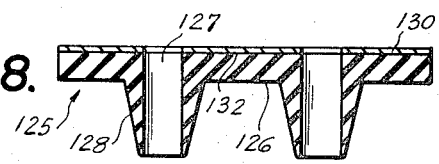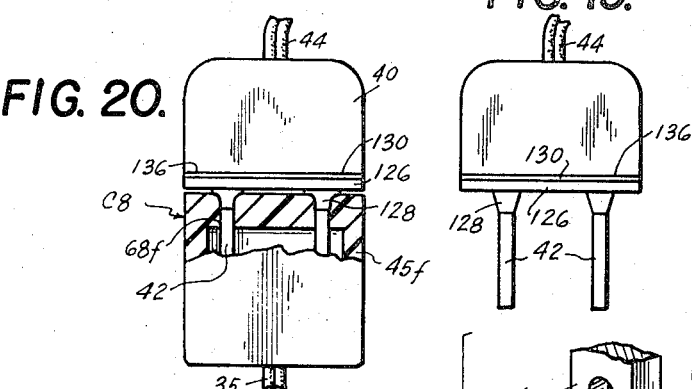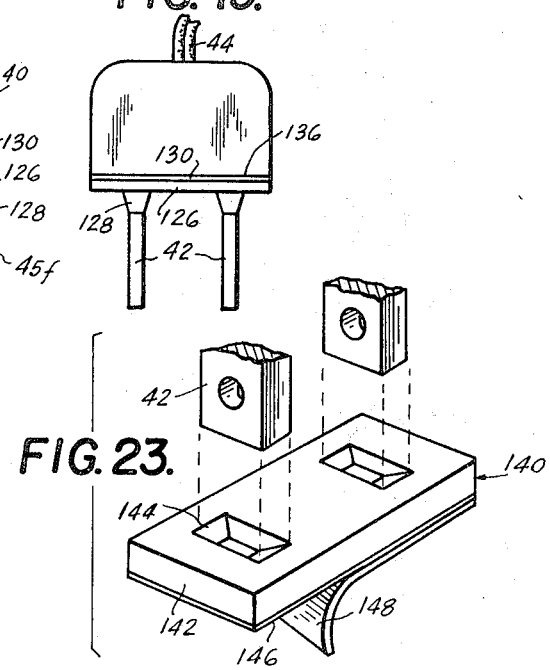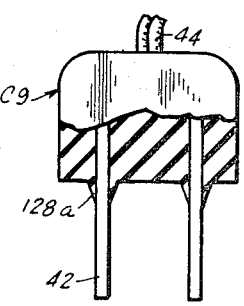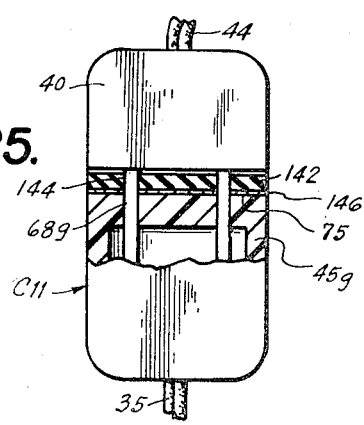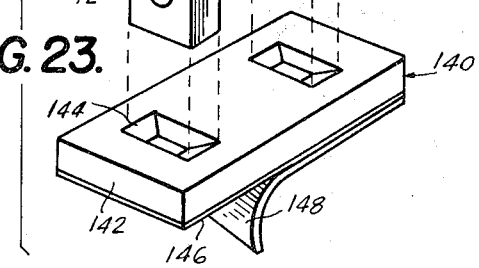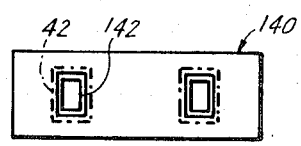
INVENTOR.
ANDREW M. ARCHER
BY Polachek & Saulsbury
ATTORNEYS.

Nov. 24, 1970    A. M. ARCHER    3,543,218
SAFETY CONNECTORS FOR ELECTRICAL EXTENSION CORDS
Filed March 8, 1968    5 Sheets-Sheet 5
FIG. 26.
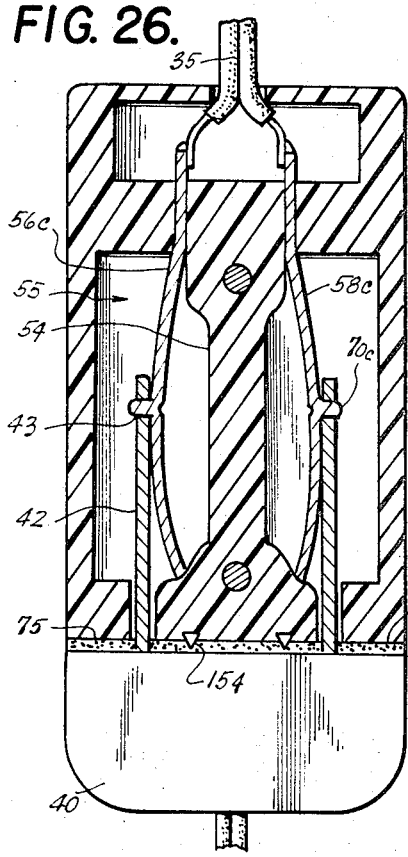
FIG. 27.
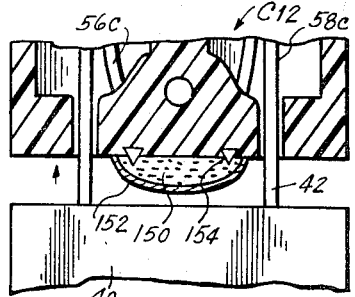
FIG. 28.
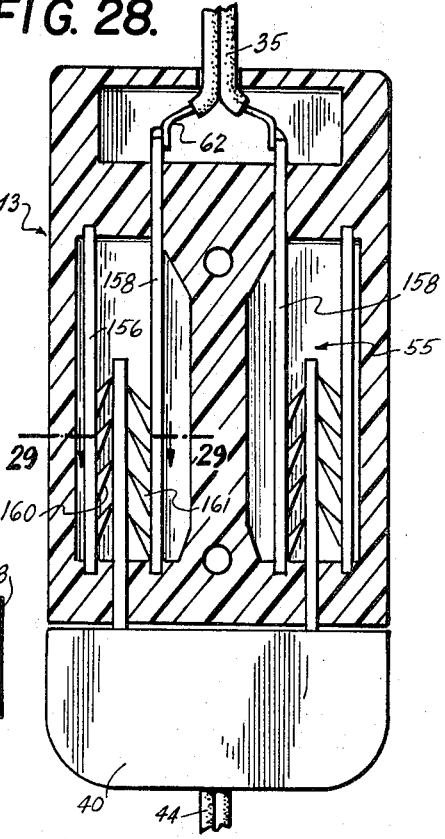
FIG. 29.
FIG. 30.
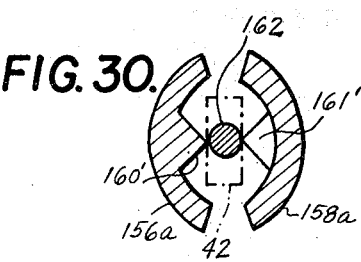
FIG. 32.
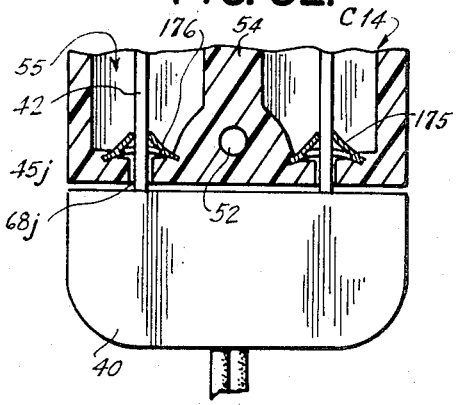
FIG. 31.
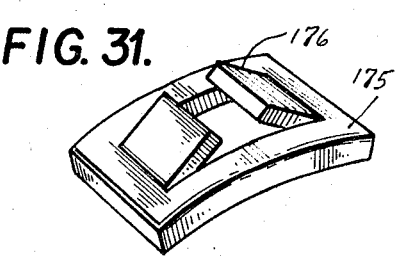
INVENTOR.
ANDREW M. ARCHER
BY
*Polachek & Saulsbury*
ATTORNEYS

United States Patent Office 3,543,218
Patented Nov. 24, 1970

3,543,218
SAFETY CONNECTORS FOR ELECTRICAL
EXTENSION CORDS
Andrew M. Archer, c/o Seaman's Unit,
San Francisco, Calif. 94119
Filed Mar. 8, 1968, Ser. No. 711,558
Int. Cl. H01r 13/20
U.S. Cl. 339—74                       1 Claim

ABSTRACT OF THE DISCLOSURE

Electrical connectors are described having means which permit relatively easy mutual engagement of a plug and receptacle, but which prevent or inhibit separation of the plug and receptacle. One way gripping devices of various types are installed in or built in receptacles to grip one or more prongs of a plug. The gripping devices include spring contact elements having rigid knobs, tips or teeth which engage sides of the prongs or engage in holes in the prongs. The gripping devices also include resilient teeth which frictionally grip the prongs, and permit disengagement of the prongs only by twisting, turning or otherwise manipulating the plugs with respect to the receptacles.

---

The invention is particularly directed at means for permanently or semi-permanently engaging an electrical plug with a receptacle, jack or socket.

Heretofore, when a power cord attached to an electrical appliance was too short, the usual means of lengthening the cord was to splice another cord on to the power cord if a permanent lengthening was desired. If a conventional extension cord with a plug and socket or receptacle at opposite ends was used, the plug of the appliance cord too easily and frequently became separated from the receptacle of the extension cord. This undesired separation of plug and receptacle created a safety hazard and frequent inconvenience and annoyance by sudden cutting off of power to the appliance.

This present invention is directed at overcoming the above and other difficulties of such electrical connector assemblies, by providing electrical receptacles of power extension cords with means for permanently or semi-permanently engaging plugs of appliance cords.

According to the invention, spring contacts are provided in a receptacle with projections thereon to grip prongs of a plug by engaging in holes in the prongs. The prongs can be released only by twisting or turning the plugs or by working the plugs back and forth laterally with respect to the receptacles. The projections can have teeth so arranged that the prongs cannot be released. In another form of the invention the receptacles are made of resilient material and have parts which yieldably grip the prongs inserted in the receptacles. In a further form of the invention, adapters are provided for the plugs to grip the receptacles.

The invention will be described in further detail in connection with the drawings wherein:

FIG. 11 is a plan view of an assembly of plug and receptacle illustrating a sixth form of the invention.

FIG. 12 is a cross sectional view taken on the line 12—12 of FIG. 11 and showing the position of parts prior to gripping of the plug in the receptacle.

FIG. 13 is a view similar to FIG. 12 showing the parts of the receptacle set to grip the plug.

FIG. 14 is an exploded side view partially in section of a receptacle and plug illustrating a seventh form of the invention.

FIG. 15 is a side view partially in section showing the plug and receptacle of FIG. 13 in mutual engagement.

FIG. 16 is a sectional view taken on line 16—16 of FIG. 15.

FIG. 17 is a perspective view of an adapter employed to grip prongs of a plug in a receptacle.

FIG. 18 is a sectional view taken on line 18—18 of FIG. 17.

FIG. 19 is a side view of a plug on which is mounted the adapter of FIGS. 17 and 18, and illustrating an eighth form of the invention.

FIG. 20 is a side view partially in section of an assembly of plug and connection, employing the plug of FIG. 19 and the adapter of FIGS. 17 and 18.

FIG. 21 is a side view partially in section of a plug illustrating a ninth form of the invention.

FIG. 22 is a perspective view of a receptacle illustrating a tenth form of the invention.

FIG. 23 is an exploded perspective view with parts broken away of another adapter employed to grip prongs of a plug.

FIG. 24 is a reduced top plan view of the adapter of FIG. 23.

FIG. 25 is a side view partially in section of a plug and receptacle shown provided with the adapter of FIGS. 23, 24 and illustrating an eleventh form of the invention.

FIG. 26 is a plan view partially in section of an assembly of plug and receptacle illustrating a twelfth form of the invention.

FIG. 27 is a side view partially in section of portions of the plug and receptacle of FIG. 26, shown separated, but with means for permanently securing the plug and receptacle together.

FIG. 28 is a view similar to FIG. 27 of another assembly of plug and receptacle illustrating a thirteenth form of the invention.

FIG. 29 is an enlarged fragmentary cross sectional view taken on line 29—29 of FIG. 28, showing the prong gripping means employed.

FIG. 30 is a view similar to FIG. 29, showing another form of prong gripping means.

FIG. 31 is a perspective view of another prong gripping means.

FIG. 32 is a fragmentary side view partially in section of an assembly of plug and receptacle employing prong gripping means such as shown in FIG. 31, and illustrating a fourteenth form of the invention.

Figure 4:
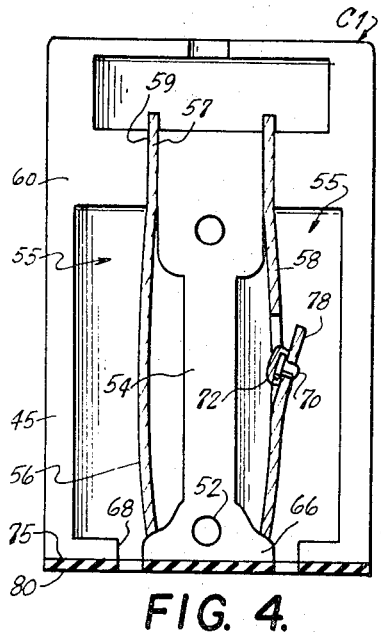
FIG. 4 is a view similar to FIG. 2, showing the receptacle alone, the plug having been removed.

Referring first to FIGS. 1–5, there is shown a receptacle C1 at one end of an extension cord 35. The cord terminates in a conventional plug 36 which can be plugged into a suitable power outlet. Associated plug 40 is also shown. This plug has prongs 42 which engage in receptacle C1. The prongs have holes 43. Plug 40 is secured to one end of an appliance cord 44. The other end of the cord 44 terminates at a suitable electrical appliance (not shown).

Receptacle C1 has a generally rectangular hollow casing or body 45 which can be closed at one side by a cover plate 46. Screws 48 extend through holes 50 in the cover plate and engage in threaded holes 52 in the receptacle body. A longitudinally extending ridge 54 is provided in the body 45. At opposite sides of the ridge are cavities 55. Two bowed leaf springs 56, 58 extend longitudinally of cavities 55. One end 57 of each spring is fitted in a slot 59 formed between one end of the ridge and lateral abutments 60. The distal ends of the springs are connected to conductors 62 of cord 35 by solder 64. The other ends of the springs bear on shoulder abutments 66 formed at the other end of the ridge 54 adjacent rectangular holes 68. A hard tip 70 formed of nylon or other tough, rigid, durable material is set into a cup 72 pressed out of the material of spring 58. The tip is a projection with a rounded end which engages in hole 43 of one of the prongs 42. The prongs extend through holes 68 at end 75 of the receptacle. The holes can have extensions 68' in the end of cover plate 46 as clearly shown in FIG. 3. The holes are wider than the thickness of the prongs and are substantially as long as the widths of the prongs. The spring 58 can be formed with a struck out tongue 78 if desired and cup 72 can be formed in this tongue. In any case the projecting tip is spring mounted to yield laterally to the left as shown in FIG. 4, when one of prongs 42 engages the bowed spring 58 as the prongs are pushed into the receptacle. An apertured resilient gasket 80 can be applied to end 75 of the receptacle.

Figure 2:
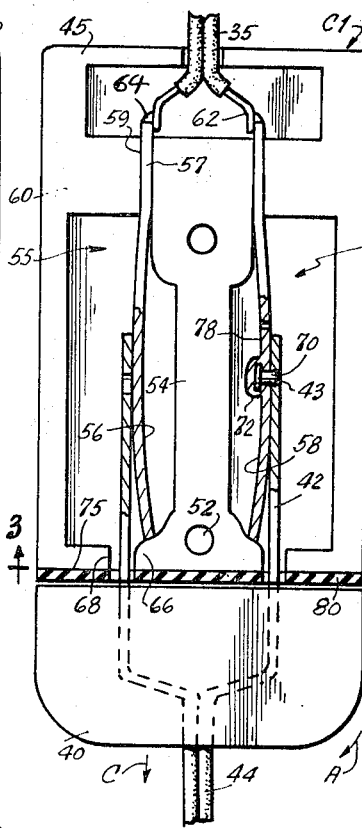
FIG. 2 is an enlarged plan view, partially in section a first assembly of plug and receptacle illustrating a first form of the invention.
Figure 5:
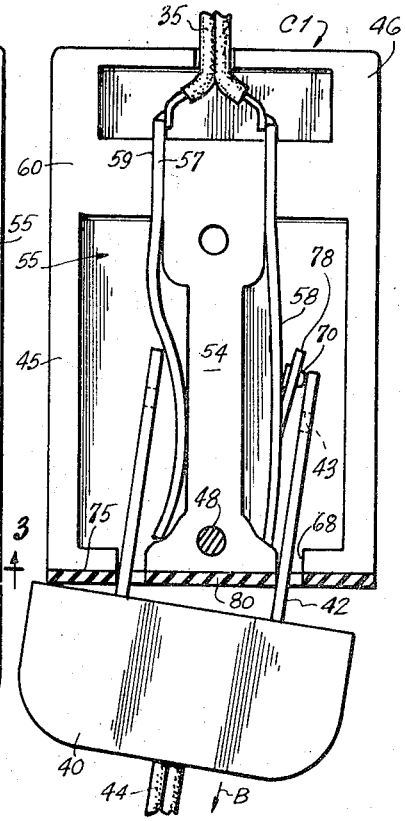
FIG. 5 is a view similar to FIG. 2, illustrating how the plug is removable from the receptacle.
Figure 1:
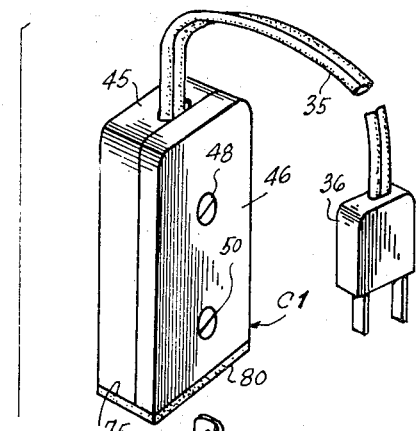
FIG. 1 is an exploded perspective view of a first assembly including an extension cord with receptacle embodying the invention, shown with an associated appliance cord, parts being broken away.

FIG. 2 shows tip 70 engaged in hole 43 on one prong 42. The plug is thus safely engaged with the receptacle and will not separate readily therefrom. To separate the plug from the receptacle the plug must be turned angularly in the direction of curved arrow A until the tip 70 disengages from hole 43 of the prong, then as shown in FIG. 5 the plug can be pulled axially in direction B which is angular to the axis of the receptacle, so that the prongs slide out of holes 68'. It will be apparent that a pull in direction C such as would be exerted on the plug in normal use will not disengage the plug 40 because it will be held securely by projecting pin 70. This is a semi-permanently engaged assembly and will be found of general utility. It can be effected without use of any tools to engage or disengage the plug and receptacle. It is safe, simple and foolproof. It is economical to manufacture.

Figure 3:
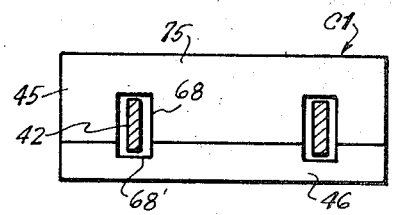
FIG. 3 is a cross sectional view taken on line 3—3 of FIG. 2.

It will be noted in FIGS. 2–4 that only one prong spring contact 58 is provided with a projection 70. The other spring contact 56 is smooth and contacts the adjacent prong in spring tension to insure good electrical contact. This spring contact 56 resiliently yields and bends as shown in FIG. 5, to permit the tip 70 to disengage from hole 43 in the adjacent prong 42.

Figure 6:
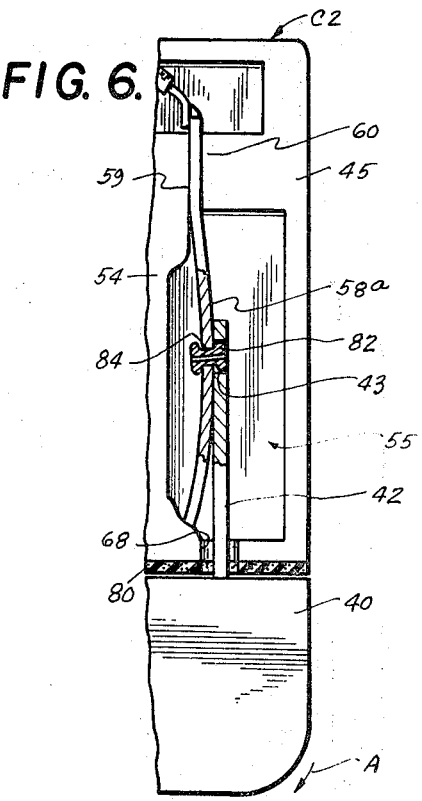
FIG. 6 is a fragmentary plan view of a second assembly of plug and receptacle, showing a second form of the invention.

In FIG. 6 is shown another receptacle C2 which is generally similar to receptacle C1 and corresponding parts are identically numbered. Only one spring contact 58a is shown. The other spring contact is the same as spring contact 56 of receptacle C1. In spring contact 58a an eyelet 82 is fitted in a hole 84 in the body of the spring contact. This eyelet engages in hole 43 of prong 42 inserted in the receptacle. The assembly of plug 40 and receptacle C2 as shown in FIG. 5 is also a semi-permanent one which can be disengaged by the turning movement indicated by arrow A.

Figure 7:
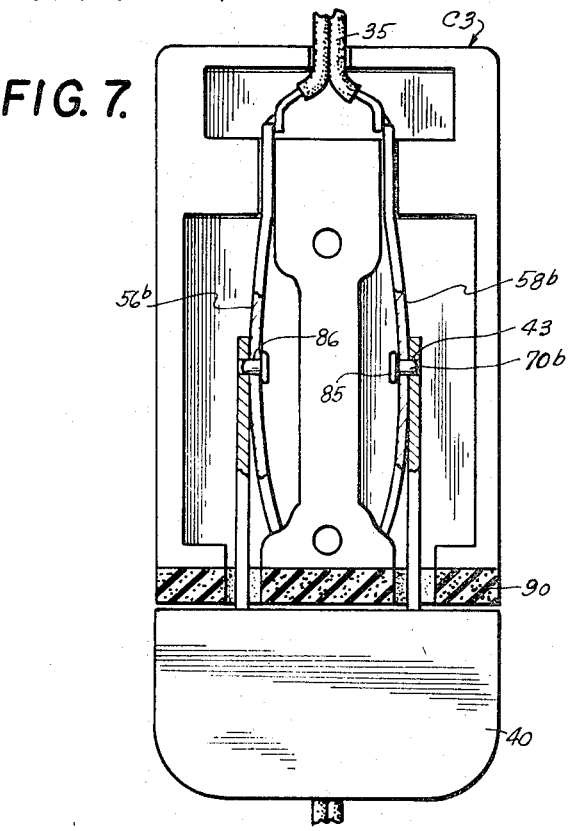
FIG. 7 is a plan view similar to FIG. 2 of a third assembly of plug and receptacle, illustrating a third form of the invention.
Figure 8:
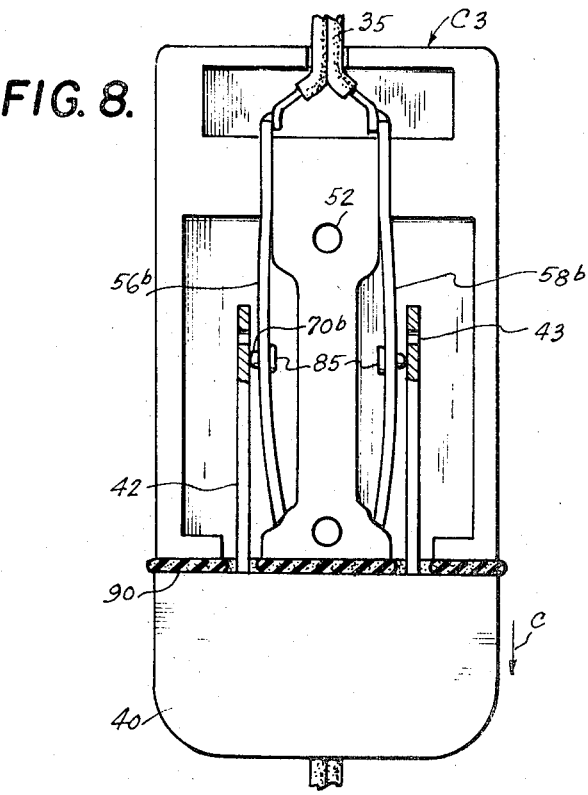
FIG. 8 is a view similar to FIG. 7 showing how the plug can be disengaged from the receptacle of the third assembly.

In FIGS. 7 and 8 is shown an assembly of plug 40 and receptacle C3. Receptacle C3 is like receptacles C1 and C2 and corresponding parts are identically numbered. Spring contacts 56b and 58b are both provided with short rounded tips 70b formed at the ends of rivets 85 engaged in holes 86 in the bowed springs. These tips engage in holes 43 in both prongs 42. A thick, resilient apertured pad 90 is secured to end 75 of the receptacles by a suitable adhesive or other means. This pad can be compressed as shown in FIG. 8 when the plug is pushed firmly into the receptacle to disengage the prongs 42 from tips 70b. Then the plug can be pulled quickly in direction C. The prongs will not be held by the tips which will snap into and out of the holes as the plug 40 is pulled out of the receptacle.

Figure 9:
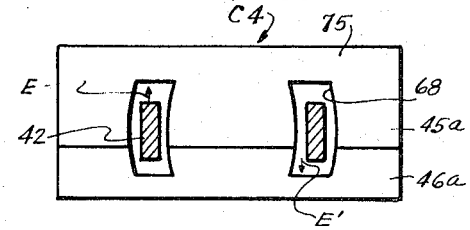
FIG. 9 is a view similar to FIG. 3, illustrating a fourth form of the invention and showing a modification of the receptacle to permit disengagement of the plug and receptacle but twisting the plug.

FIG. 9 shows a receptacle C4 in which arcuate holes 68a are formed in end 75 of the receptacle and cover plate 46a. The prongs 42 can be worked loose by twisting or turning the plug 40 in the direction of arrows E, E'. If holes 68 of receptacles C1, C2 or C3 have this formation, the body 45a of the receptacle and the cover plate 46a must be thick enough.

Figure 10:
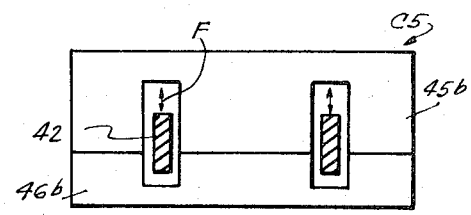
FIG. 10 is a view similar to FIG. 9 illustrating a fifth form of the invention and showing a further modification of the receptacle to permit disengagement of the plug by working it laterally.

FIG. 10 shows a receptacle C5 in which the holes 68b in end 75 have a width substantially the same as the thickness of prongs 42, but the lengths of the holes exceed the widths of the prongs. Thus the prongs can be worked back and forth laterally in direction F to release the prongs from the receptacle. This arrangement of holes can be employed in any of receptacles C1, C2 or C3 if body 45b and cover plate 46b are thick enough.

FIGS. 11 and 12 and 13 show another assembly in which plug 40 is detachably engaged with receptacle C6. The body 45c of this receptacle is made of resilient rubber or plastic material. A bore 100 extends transversely of the body 45c and has an enlargement 102. A bolt 103 has a shaft 104 which extends through the bore 100 and its threaded enlarged end is engaged with a nut 106 secured at the outer end of bore enlargement 102. By this arrangement the bolt cannot be accidentally loosened from the body 45c. A knurled knob 108 is secured at the outer end of shaft 104. This knob can be turned to press the resilient body 45c inwardly as clearly shown in FIG. 13. Prongs 42 of the plug fit in holes 68e in the receptacle. When the knob 108 is turned to press the body 45c inwardly the edges 68e' and 68e'' of the holes engage the edges of the prongs 42 and effectively hold the plug engaged with the receptacle. One turn or so of the knob 108 will be sufficient to allow the body 45c to expand and release the prongs so that the plug can be disengaged easily from the receptacle.

In FIGS. 14–16 is shown another semi-permanently engaged assembly of a plug 40 and receptacle C7. The body 45d of the receptacle is made of resilient rubber or plastic material. Inwardly projecting resilient teeth or blades 110 are obliquely disposed in the direction of insertion of the prongs 42 as shown in FIG. 14. When the prongs are fully inserted, the teeth 110 are deformed or distorted and frictionally grip the prongs. To release the plug, a rather forceful pulling in direction G will have to be exerted or the prongs will have to be twisted or turned while the prongs are gradually worked out of the receptacle. Conductive contact members 112 are provided in the body 45d and these laterally contact the prongs 42 as shown in FIG. 16 when the prongs are fully inserted. Wires 62 of power cord 35 are connected to contact members 112.

In FIGS. 17 and 18 is shown an adapter 125 made of resilient rubber or plastic material. The adapter has a flat rectangular pad 126 provided with spaced holes 127. Tapered tubular projections 128 are integrally formed with the body pad. An adhesive layer 130 overlays upper side 132 of body 126 and is protected by removable cover strip 134, shown partially removed in FIG. 17. This adapter can be fitted on the prongs 42 of plug 40 as shown in FIG. 19. The adhesive layer 130 will adhere to end 136 of the plug. The resilient projections 128 are wedge shaped. When prongs 42 are fitted into holes 68f in receptacle C8, the projections deform and frictionally grip the sides of the holes, as shown in FIG. 20. Thus the plug cannot accidentally come loose. Considerable force will be required to pull the prongs loose from the body 45f of the receptacle once the wedge shaped projections are forced into holes 68f.

In FIG. 21, the tapered wedge shaped projections 128a are integrally formed or molded in the plug C9 which is made of resilient rubber or plastic material. These projections surround prongs 42 and will engage in holes 68f of the receptacle C8 in the same manner as illustrated in FIG. 20.

In FIGS. 23 and 24 is shown another adapter 140 made of a resilient rubber or plastic material. The adapter has a flat rectangular pad 142 provided with spaced holes 144 which are tapered in form inwardly of the pad. The holes are narrower and shorter than the thickness and width of prongs 42. A pressure sensitive adhesive layer 146 with removable cover strip or tab 148 is applied to the underside of the pad. The pad is shown applied to the end 75 of the receptacle C11. The prongs 42 expand and distort the holes 142 when they are forced through pad 142 into the body 45g of the receptacle. However, the prongs can be disengaged by twisting and pulling on the plug. This is another semi-permanent assembly of plug and receptacle.

In FIG. 22 is shown receptacle C10 in which holes 68h are oval in form at end 75 of the receptacle body 45h. The body 45h of the receptacle is made of resilient rubber or plastic material. The holes 68h are smaller in size than prongs 42 of plug 40 so that they will effectively but releasably grip the prongs. Receptacles C10 has the advantage that the holes can be integrally formed with the body 45h.

FIG. 26 shows a receptacle C12 and a plug 40 joined in a permanent assembly. The parts correspond to those of receptacles C1–C3 and are identically numbered. In receptacle C12, elongated projections 79C are formed on the bowed spring contacts 56c and 58c. These projections lock into holes 43 of prongs 42 so that the pronged plug cannot be worked out of the receptacle. In addition adhesive layer 150 secures abutting ends of the plug and receptacle together to form a permanent assembly. The prongs can easily be inserted into the receptacle, but once the projections engage in holes 43, the plug 40 cannot be pulled loose.

FIG. 27 shows a convenient way of applying the adhesive 150. Adhesive 150 is in liquid or paste form and is contained in a thin walled pod 152 at the end 75 of the receptacle. Fine pins or points 154 are embedded in the end of the body of the receptacle. These pins will puncture the pod 152 to release the adhesive when the plug 40 is pressed against the end 75 of the receptacle.

FIG. 28 shows another receptacle C13 in which parts corresponding to those of receptacles C1–C3 are identically numbered. In this receptacle a permanent assembly is made with prongs 42 of plug 40. Two spaced spring bars 156, 158 are provided in each recess 55. These bars have opposing sharp prongs or teeth 160, 161 which face generally in the direction of insertion of prongs 42. Once the prongs 42 are inserted, the teeth 160, 161 dig into the sides of prongs 42 and prevent their removal from the receptacle. The bars 158 serve as electrical contact members to which wires 62 of cord 35 are connected.

FIG. 29 shows that the bars 156 and 158 are rectangular in cross section. FIG. 30 shows that bars 156a and 158a could be arcuate to accommodate round or cylindrical prongs 162. The teeth 160', 161, will grip the prongs in the same manner as in receptacle C13. Of course the arcuate bars 156a can be used with rectangular prongs 42 as indicated by dot and dash lines in FIG. 30.

FIGS. 31 and 32 show another type of gripper member 175 which can be used for permanently gripping prong 42. As shown in FIG. 32, rectangular bowed gripping members 175 are embedded in body 45j of receptacle C14 at entrance holes 68j. Teeth 176 are inclined inwardly and dig into the prongs 42 preventing their disengagement from the receptacle.

In the several forms of the invention, a plug with two prongs has been shown. However, it will be understood that a plug having three round or flat prongs can be employed and the receptacles will be designed to grip them either permanently or semi-permanently as already explained.

While I have illustrated and described the preferred embodiments of my invention it is to be understood that I do not limit myself to the precise construction herein disclosed and that various changes and modifications may be made within the scope of the invention as defined in the appended claim.

What is claimed is:

1. A receptacle for receiving prongs of a plug, said prongs being flat parallel members each having a hole near its free end; comprising in combination: an elongated, flat, hollow body having holes at one end for insertion of said prongs; a pair of leaf spring members spaced apart and extending longitudinally inside said body, said spring members being secured in said body near the other end thereof with a free end located near one of the holes at said one end of said body, at least one of said spring members having a laterally struck out spring tongue with a recessed cup formed in said tongue; and a wear resistant tip secured in said cup and extending laterally outwardly thereof to engage in a hole in one of the prongs, whereby the plug can be released from said receptacle only by angularly twisting and turning the plug to work the tip out of engagement with said hole in said one prong.

References Cited

UNITED STATES PATENTS

| | | | |
|---|---|---|---|
| 1,341,468 | 5/1920 | Kenney | 339—74 |
| 1,941,374 | 12/1933 | Weisberg | 339—74 |
| 2,002,558 | 5/1935 | Von Holtz | 339—74 |
| 2,115,010 | 4/1938 | Douglas | 339—91 |
| 2,274,798 | 3/1942 | Kostal | 339—74 |
| 2,610,266 | 9/1952 | Greeson | 200—51.09 |

MARVIN A. CHAMPION, Primary Examiner

J. H. McGLYNN, Assistant Examiner

U.S. Cl. X.R.

339—75